United States Patent [19]
Matheson et al.

[11] Patent Number: 5,903,755
[45] Date of Patent: May 11, 1999

[54] METHOD AND SYSTEM FOR INTERENVIRONMENT OBJECT CONTROL

[75] Inventors: Richard J. Matheson; Lynn T. Monson, both of Lindon, Utah

[73] Assignee: Novell, Inc., Provo, Utah

[21] Appl. No.: 08/616,862

[22] Filed: Mar. 15, 1996

[51] Int. Cl.$^6$ ........................................................ G06F 9/40
[52] U.S. Cl. ............................................................... 395/683
[58] Field of Search .................................... 395/680, 682, 395/683

[56] References Cited

U.S. PATENT DOCUMENTS

| | | | |
|---|---|---|---|
| 5,214,756 | 5/1993 | Franklin et al. | 345/348 |
| 5,414,848 | 5/1995 | Sandage et al. | 395/677 |
| 5,481,708 | 1/1996 | Kukol | 395/709 |
| 5,487,158 | 1/1996 | Amelina et al. | 395/705 |
| 5,490,256 | 2/1996 | Mooney et al. | 395/568 |

OTHER PUBLICATIONS

Eddon, Guy, "DDE to DOS", Windows–DOS Developer's Journal, v4, n8, p63(16), Aug. 1993.

Sipe, Steven, "Calling 16–bit DLLs from Windows 95", Dr. Dobbs's Journal, pp(6), Apr. 1996.

Finnegan, James, Test Drive Win32 from 16–bit Code using the Windows NT WOW layer and Generic Thunk, Microsoft Systems Journal, pp(76), Jun. 1994.

Schulman, Andrew, "Call VxD Functions and VMM Sevices Easily Using our Generic VxD", Microsoft Systems Journal, pp. 17–35, 37, Feb. 1993.

*Primary Examiner*—Alvin E. Oberley
*Assistant Examiner*—St. John Courtenay, III
*Attorney, Agent, or Firm*—Dinsmore & Shohl LLP

[57] ABSTRACT

A method for a process in a first code environment to control an object in a second code environment. A first code environment application communicates an object control command to a first environment library. The first code environment library communicates the object control command over a communications link to a second code environment process. The second code environment process communicates the object control command to a second code environment object controller.

10 Claims, 2 Drawing Sheets

METHOD AND SYSTEM FOR INTERENVIRONMENT OBJECT CONTROL

TECHNICAL FIELD

This invention generally relates to controlling an object in a code environment, and is more particularly related to a method and system by which a process in a first code environment can control an object in a second code environment, in an operating system capable of supporting multiple code environments.

BACKGROUND OF THE INVENTION

As conventional computers contain increasingly larger amounts of memory, operating systems have evolved to utilize such larger amounts of memory more efficiently. As operating systems evolve and offer additional services and features, application software is being rewritten to utilize the new features offered by operating systems. While it would be preferable to implement a new operating system and new application software on a computer simultaneously, this rarely occurs. It is more common to implement a new operating system on a computer and gradually, over time, implement new application software which more fully utilizes the new operating system. To allow this gradual migration of old software to new software, an operating system must be able to support the previously existing application software as well as the new application software.

One example of an operating system which has the ability to execute older conventional application software as well as the new generation of application software is the Windows® 95 operating system, marketed by Microsoft Corporation of Redmond, Wash., U.S.A. Windows® 95 supports both older, conventional 16-bit software and newer 32-bit software. The ability to support two code environments, a 16-bit code environment and a 32-bit code environment is necessary to allow the large number of existing 16-bit application programs to continue to execute on the new Windows operating system.

Typically, a software company will continue to sell and support its conventional software, such as 16-bit software, while adding program enhancements to newer versions of its software, such as 32-bit software, which can take advantage of new features offered by a new operating system.

Application programs can be written to communicate with other application programs. The ability to communicate between application programs allows one application program to utilize features offered by another application program. Since additional enhancements and modifications to application programs are generally introduced into newer application programs rather than older, existing programs, it is very beneficial for older, conventional application programs to be able to communicate with newer application programs, which generally offer the newest features.

Currently in the software field, older conventional 16-bit software is being migrated to newer generation 32-bit software. In the future, 32-bit software will be considered conventional, and there will be a migration to newer 64-bit software. It would advantageous for older conventional software to be able to communicate with newer generation software in order to access features only offered by the newer generation software.

A "thunk" is one method used to communicate between older conventional software such as a 16-bit application and newer generation software such as a 32-bit application. A thunk is essentially a segment of code which interfaces between a 16-bit code application and a 32-bit code application. U.S. Pat. Nos. 5,487,158 and 5,490,256 disclose a compiler which automatically generates thunk code which achieves a transfer of control between a 16-bit application and a 32-bit application. The thunk code includes a thunk prolong element or routine and a thunk epilog element or routine. One disadvantage of thunking between 16-bit code and 32-bit code is the complexity and corresponding significant amount of effort required to generate the thunk code.

U.S. Pat. No. 5,414,848 discloses a method and apparatus for sharing the code of a DOS application between multiple virtual machines.

U.S. Pat. No. 4,214,756 discloses a method for manipulating iconic representations of applications by automatically controlling a communications link between icons and an associated source application. In one embodiment disclosed in the '756 patent, the communications link used is Dynamic Data Exchange (DDE).

Thus, it is apparent that there is a need for a method and system which allows a conventional application in a first code environment to communicate with and access the increased functionality and enhancements of a newer generation application in a second code environment without having to develop complicated thunk code.

SUMMARY OF THE INVENTION

It is one object of this invention to provide a method and system for controlling an object in a second environment from a process in a first environment without the significant and complex effort required to develop thunk code.

It is yet another object of this invention to provide a method and system for a conventional 16-bit application to access, manipulate and display newly enhanced functionality existing in a 32-bit application.

Additional objects, advantages and other novel features of the invention will be set forth in part in the description that follows and, in part, will become apparent to those skilled in the art upon examination of the invention. The objects and advantages of the invention may be realized and obtained by means of the instrumentalities and combinations particularly pointed out in the appended claims.

According to one preferred embodiment of this invention, these and other objects are achieved in a method which includes an application in a first environment calling a library in a first environment and passing to the library a first object control command. The library in the first environment can convert the first object control command to a string variable, if necessary, and can initiate a communications link with a process in a second environment. After establishing the communications link, the library can communicate a second object control command, which can be generated as a function of the first object control command, to the process in the second environment. The process in the second environment can convert the second object control command to a third object control command, such as an appropriate object method or property, if necessary. The process in the second environment communicates the third object control command to an object controller in the second environment. The object controller can invoke, manipulate, or otherwise affect the desired object. If the object returns a result or value, the object controller can communicate the object result or value to the process in the second environment. The process in the second environment can convert the object result or value to a string, if necessary, and communicate the string over the communications link to the library. The library can convert the object result or value from a string to an appropriate application data type and can return the object result or value to the application program.

Accordingly, the method according to one preferred embodiment of this invention allows an application program in a first environment to control an object in a second environment with an object command, and after receiving an object result or value generated as a function of the object command, can determine the status of the object.

The method and system according to this invention allows a 16-bit application to use the new enhancements and features offered by a 32-bit application. The method and system according to this invention generally simplifies the control of a 32-bit object from a 16-bit application compared to other conventional means of such control, for example through the use of thunk code.

According to another preferred embodiment of this invention, the communications link between the library in the first environment and the process in the second environment is established through Dynamic Data Exchange (DDE). Because conventional development compilers simplify the use of DDE communications, the method according to this invention can greatly ease the control of 32-bit objects by 16-bit applications.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of other different obvious aspects all without departing from the invention. Accordingly, the drawings and description will be regarded as illustrative in nature and not as restrictive.

BRIEF DESCRIPTION OF THE DRAWINGS

The accompanying drawings incorporated in and forming a part of the specification, illustrate that several aspects of the present invention, and together with the descriptions serve to explain the principles of the invention. In the drawings.

Reference will now be made in detail to the present preferred embodiment of the invention, an example of which is illustrated in the accompanying drawings, wherein like numerals indicate the same elements throughout the views.

DESCRIPTION OF PREFERRED EMBODIMENTS

Throughout the specification and claims, the phrase "first environment" shall be used to refer to a code environment in an operating system in which a first particular type of code is executed. For example, the Windows® 95 operating system marketed by Microsoft runs 16-bit code in a particular environment, and this can be referred to as a first environment. Similarly, the phrase "second environment" shall be used to refer to a code environment in which an operating system executes a second particular type of code. For example, a second environment could be a code environment in which the Windows® 95 operating system runs 32-bit code. As used herein, the phrases "first environment" and "second environment" also could be interchanged to refer to 32-bit code environments and 16-bit code environments, respectively, or to a 32-bit code environment and a 64-bit code environment.

Figure 1:
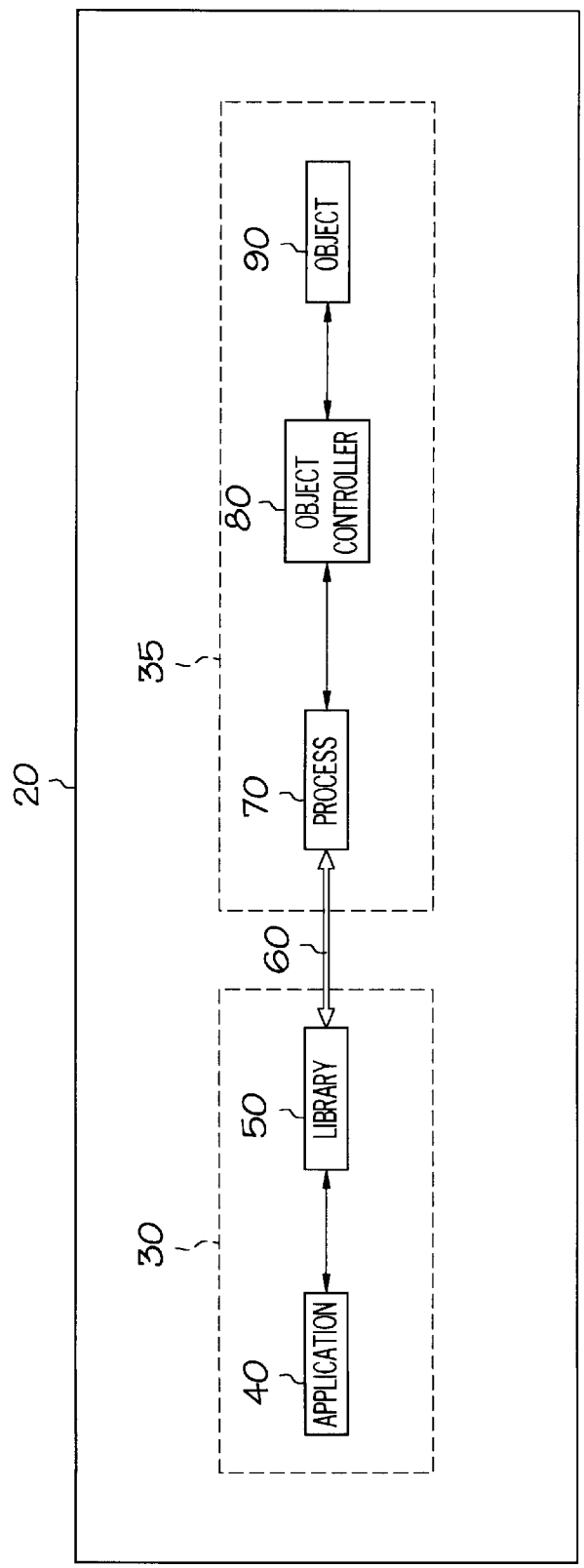
FIG. 1 is a block diagram according to one preferred embodiment of this invention.

Referring now to the drawings, FIG. 1 is a block diagram showing the method according to one preferred embodiment of this invention. Operating system 20 is a program capable of supporting at least two code environments. Application 40 executes in first environment 30. The use of the words program, process, task, and application are used synonymously and are not meant to limit the invention to a particular type of executing process. Application 40 can comprise any suitable program, such as a 16-bit program, which includes the ability to invoke a library process such as library 50. According to one preferred embodiment of this invention, library 50 is a Dynamic Link Library (DLL). DLLs are well known to those skilled in the art and will not be discussed in detail.

Some 16-bit applications provide the ability to establish a link to a library that is specified at run-time. This feature enables users to develop libraries which provide features not provided by the 16-bit application. For example, the InForms™ electronic forms automation software manufactured by Novell, Inc. allows a user to specify a library name, a function entry point within the library, and the parameters associated with the function. InForms can then link to the library, and call the specified function entry point to provide additional features not available in InForms. In the context of the method according to this invention, application 40 could comprise the InForms™ software, which calls library 50.

Application 40 passes a first object control command to library 50. Library 50 is also executing within either the same first environment 30 or another first environment 30 executing in operating system 20. Because library 50 and application 40 comprise the same type of object code, for example, 16-bit object code, no thunking occurs when application 40 calls library 50.

The phrase object control command is used herein to encompass any command sent by application 40 which is communicated to library 50, process 70 and ultimately object controller 80, as discussed below, which is being communicated with the intent to establish, terminate, manipulate, query, or otherwise relate to object 90.

Library 50 determines if communications link 60 between first environment 30 and second environment 35 exists. If communications link 60 does not exist, library 50 initiates communications link 60. According to one preferred embodiment of this invention, communications link 60 comprises a Dynamic Data Exchange (DDE) link, an interprocess communications link known to those skilled in the art. DDE enables one application to communicate string-type information to another application. Library 50 can translate the first object control command to any suitable data variable type, as desired or as necessary. For example, if communications link 60 is implemented as a DDE link, library 50 can convert the first object control command, if not already a string-type variable, into a second object control command which is a string-type variable.

Library 50 communicates the second object control command over communications link 60 to process 70. Process 70 executes in second environment 35. Process 70 converts the second object control command to a third object control command suitable for object controller 80, if necessary. For example, if the second object control command is a string-type data variable, and object controller 80 requires nonstring-type data variables, process 70 can convert the string-type second object control command to a suitable nonstring-type third object control command. According to one preferred embodiment of this invention, the third object control command is an object method or property.

Process 70 passes the third object control command to object controller 80. Object controller 80 also executes in second environment 35. According to one preferred embodiment of this invention, object controller 80 is a dynamic link library and process 70 passes the third object control command as one or more variables to a function within object controller 80. Because process 70 and object controller 80 comprise the same type of object code, for example 32-bit object code, no thunking occurs when process 70 communicates with object controller 80. Object controller 80 interprets the third object control command and affects, queries, or otherwise manipulates object 90, accordingly. Object 90 can comprise any suitable object known to those skilled in the art. For example, object 90 can comprise another application program, a file, a storage device, an input device, or any other suitable entity which can be implemented as an object.

Object controller 80 can generate or receive a first object control response relating to the querying or manipulation of object 90. The phrase object control response is meant to include any value, result or indication relating to the object control command which is communicated by object controller 80 to process 70. According to one preferred embodiment of this invention, the object control response is returned to process 70 as one or more function variables. Process 70 can convert the first object control response to a second object control response as a function of the first object control response. For example, process 70 can convert the first object control response to a string-type data variable prior to communicating the second object control response over communications link 60 to library 50. Library 50 can convert the second object control response to a third object control response as a function of the second object control response. For example, if the second object control response is a string-type data variable, library 50 can convert the string-type data variable to any suitable data type for use by application 40. Library 50 communicates the third object control response to application 40. Application 40 can use the third object control response to determine the result of the first object control command. Thus, application 40 in first environment 30 can use the method according to this invention to control object 90 in second environment 35 without developing any complex thunk code.

Figure 2:
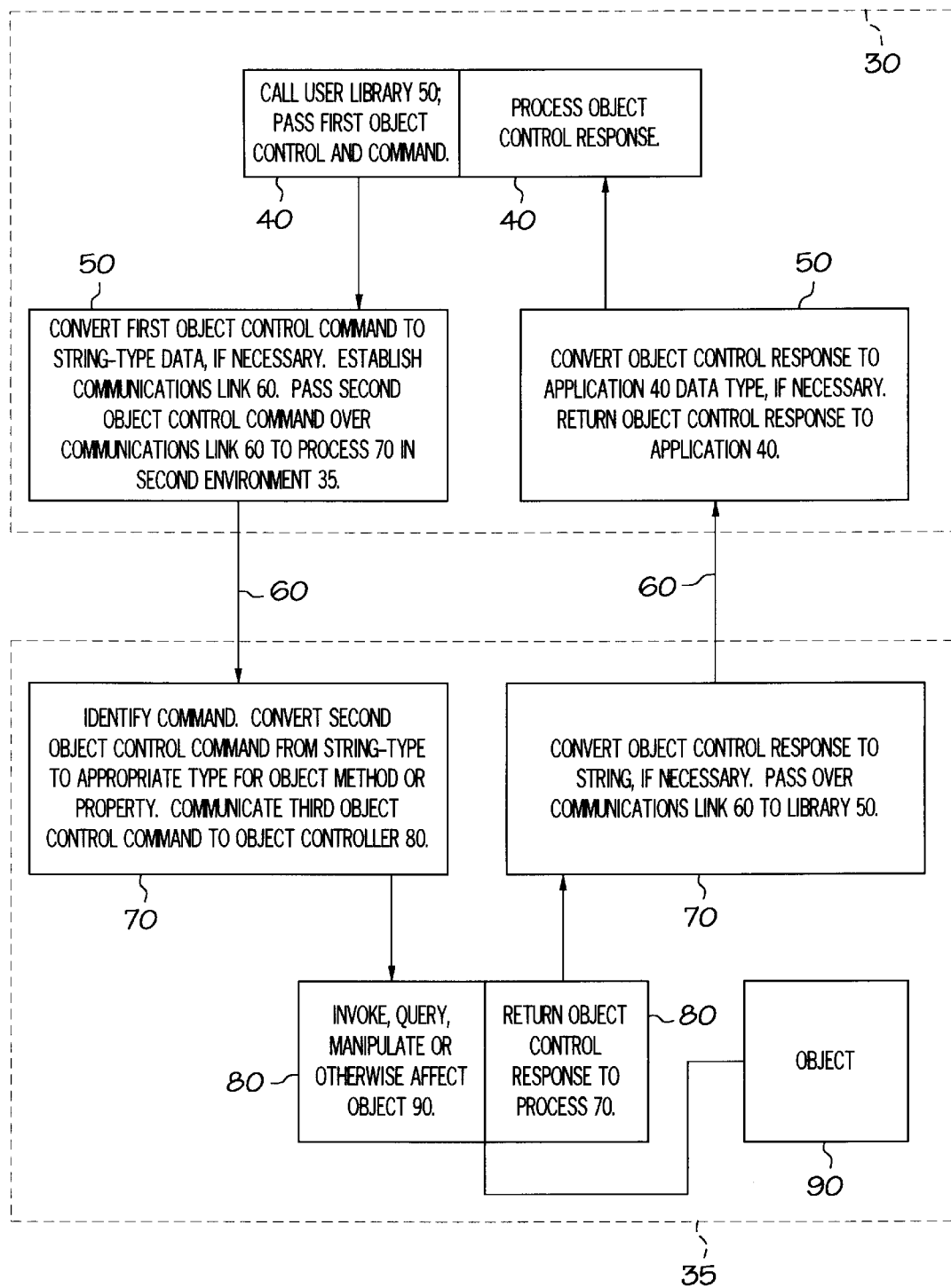
FIG. 2 is a block diagram according to another preferred embodiment of this invention.

FIG. 2 is a flow chart showing the method according to one preferred embodiment of this invention in more detail. Application 40 preferably calls library 50 and passes to library 50 a first object control command in the form of a data block. Library 50 can be created with development languages well known to those skilled in the art, for example, C and C++. C and C++ compilers are available from manufacturers such as Borland and Symantec. Library 50 can convert the data block into an appropriate variable type for communicating over communications link 60. If communications link 60 comprises a Dynamic Data Exchange communications link, library 50 will preferably convert the data block to a string-type data variable. DDE is well known to those skilled in the art, and is available through conventional compilers. Library 50 passes the second object control command over communications link 60 to process 70.

Process 70 can be generated by any suitable conventional language, for example, C, C++, or BASIC. Process 70 can create a third object control command as a function of the second object control command. For example, the second object control command can be converted from a string-type variable to an appropriate variable type in preparation for communicating the third object control command to object controller 80.

Object controller 80 can comprise any known or future object control interfaces, including object controllers implemented through an application programming interface (API). According to one preferred embodiment of this invention, object controller 80 comprises a 32-bit GroupWise XTD object controller manufactured by Novell, Inc. GroupWise XTD includes an API which can be called from 32-bit processes to control, query and otherwise manipulate objects. Object controller 80 controls or otherwise manipulates object 90 based upon the third object control command.

Object control 80 can return an object control response to process 70, which can then be communicated over communications link 60 to library 50 and returned to application 40. The object control response can be converted, if necessary, between object controller 80 and process 70, process 70 and library 50, and library 50 and application 40. Application 40 can use the object control response to determine the status of object 90.

An example of the method according to one preferred embodiment of this invention is provided below. This example assumes that application 40 comprises the 16-bit InForms™ electronic forms automation software manufactured by Novell, Inc., and that object controller 80 comprises the 32-bit GroupWise XTD object controller software manufactured by Novell, Inc. InForms provides the ability to call a 16-bit library which is "@CallFunc compatible". The @CallFunc interface of the InForms software is documented in the InForms Designer manual available from Novell, Inc. Library 50 is an @CallFunc compatible dynamic link library and was generated with the Borland Delphi 1.0 16-bit development compiler. Dynamic Data Exchange (DDE) is used as the communications link. Process 70 is a 32-bit DDE server generated with the Borland Delphi 2.0 32-bit development compiler.

Library 50 exports a set of three @CallFunc compliant entry points. The entry points are as follows:

GWORBLogin This function initializes the DDE components and creates the DDE communications link to process 70. If communications link 60 is successfully initiated, this function increments a reference count on library 50 to prevent application 40 from unloading library 50 upon return. This function expects no parameters, and returns the GroupWise session displayable name.

GWORBLogout This function unlinks from process 70 and reinitializes the appropriate DDE components. This function also decrements the reference count on library 50 to allow application 40 to unload library 50 on return.

GWORBCommand This function accepts a variable length parameter list and translates the parameter list into strings for use with communications link 60. A parameter list is entered into application 40 with the following syntax: <Command Name>, <List of comma-delimited parameters . . . >, <Return Object>. This command string is inserted as the first string in a Tstrings object, and each parameter is converted from its original application 40 data type to a string-type variable and inserted into the T strings object. The return object is referenced to determine the application 40 data type to use for the object control response. If only a single parameter is passed to library 50, it is assumed to be a command string, and the object control response type is assumed to be a string. If only two parameters are passed, the first is assumed to be a command string, and the second is assumed to identify the object control response type. After GWORBCommand converts the parameters and builds the Tstrings object, the Tstrings object is communicated over communications link 60 to process 70. The GWORBCommand function then waits in a loop until process 70 communicates an object control response value through communications link 60. The object control response is converted to the proper application 40 data type and set in a WPINDATADESCRIPTOR to return to application 40.

Process 70 is a 32-bit process which implements a DDE event handler which is invoked when library 50 passes an object control command through communications link 60. Process 70 uses object controller 80 as a set of OLE automation objects. Process 70 accepts predefined string commands which correspond to an object 90 in the object API of object controller 80. For each object 90 available, process 70 maintains a flag which indicates whether or not a particular object 90 has been initialized for use. In the case of a collection, process 70 keeps track of which object 90 from a collection was last used as the current object 90 of that type. Thus, once a specific object 90 has been requested from a collection, that object 90 can be used directly.

The foregoing description of a preferred embodiment of the invention has been presented for purposes of illustration and description. It is not intended to be exhaustive or to limit the invention to the precise method disclosed. Obvious modifications or variations are possible in light of the above teachings. For example, although reference has been made to the Windows operating system, the method according to this invention can be used in any operating system which executes one process in a first environment and another in a second environment. For example, the OS/2 operating system, manufactured by the IBM Corporation, also executes processes in multiple code environments, and future operating systems may execute 32-bit code in a first environment and 64-bit code in a second environment. It is intended that the scope of the invention be defined by the claims appended hereto.

We claim:

1. A method for controlling a 32-bit object from a 16-bit process without the use of a virtual device driver, comprising the steps of:

sending a first object control command from a 16-bit process to a 16-bit library;

establishing a dynamic data exchange (DDE) communications link between the 16-bit library and a 32-bit process;

communicating a second object control command as a function of the first object control command from the 16-bit library to the 32-bit process over the DDE comminations link;

communicating a third object control command as a function of the second object control command from the 32-bit process to a 32-bit object controller; and controlling, from the 32-bit object controller, the 32-bit object as a function of the third object control command, said steps being performed without the use of a virtual device driver.

2. A method according to claim 1, further comprising converting said second object control command to a string-type variable.

3. A method according to claim 1, further comprising converting said second object control command to an object-type variable.

4. A method according to claim 1, further comprising:

said 32-bit object controller returning a first object control response to said 32-bit process;

communicating a second object control response as a function of said first object control response to said 16-bit library over said DDE communications link; and communicating a third object control response as a function of said second object control response to said 16-bit process.

5. A method according to claim 4, further comprising converting said first object control response to a string-type variable.

6. A method according to claim 4, further comprising converting said second object control response from a string-type variable to a user-defined type variable.

7. A system for controlling a 32-bit object from a 16-bit process without the use of a virtual device driver, comprising:

means for communicating a first object control command from a 16-bit process to a 16-bit library;

a dynamic data exchange (DDE) communications link being operative to communicate a second object control command as a function of the first object control command from the 16-bit library to a 32-bit process;

means for communicating a third object control command as a function of the second object control command from the 32-bit process to a 32-bit object controller; and means for controlling, from the 32-bit object controller, the 32-bit object as a function of the third object control command, said system not using a virtual device driver.

8. A system according to claim 7, wherein the third object control command comprises a command to invoke a specified method of the 32-bit object.

9. A system according to claim 7, wherein the third object control command comprises a command to one of modify and query an attribute of the 32-bit object.

10. A computer readable medium containing software instructions operative to control a 32-bit object from a 16-bit process without the use of a virtual device driver by performing the steps of:

sending a first object control command from a 16-bit process to a 16-bit library;

establishing a dynamic data exchange (DDE) communications link between the 16-bit library and a 32-bit process;

communicating a second object control command as a function of the first object control command from the 16-bit library to the 32-bit process over the DDE comminations link;

communicating a third object control command as a function of the second object control command from the 32-bit process to a 32-bit object controller; and controlling, from the 32-bit object controller, the 32-bit object as a function of the third object control command, said steps being performed without the use of a virtual device driver.

* * * * *